United States Patent
Reck et al.

(10) Patent No.: US 7,837,181 B2
(45) Date of Patent: Nov. 23, 2010

(54) PNEUMATIC SPRING PROVIDED WITH A LEVEL MEASURING DEVICE

(75) Inventors: Siegfried Reck, Nienburg (DE);
Thomas Pehmuller, Wegensen (DE);
Christoph Bank, Lehrte/Aligse (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 1355 days.

(21) Appl. No.: 10/559,233

(22) PCT Filed: Apr. 28, 2004

(86) PCT No.: PCT/EP2004/004495

§ 371 (c)(1),
(2), (4) Date: Dec. 6, 2005

(87) PCT Pub. No.: WO2004/109150

PCT Pub. Date: Dec. 16, 2004

(65) Prior Publication Data

US 2006/0117843 A1    Jun. 8, 2006

(30) Foreign Application Priority Data

Jun. 6, 2003   (DE) ................................ 103 25 624

(51) Int. Cl.
*F16F 9/04*   (2006.01)
(52) U.S. Cl. ................... 267/64.27; 267/64.24
(58) Field of Classification Search .............. 267/64.11, 267/64.23, 64.24, 64.27
See application file for complete search history.

(56) References Cited

U.S. PATENT DOCUMENTS 3,819,399 A * 6/1974 Campbell et al. ........ 427/388.3

4,386,791 A * 6/1983 Watanabe ................. 280/6.157
6,375,168 B2   4/2002 Behrends (Continued)

FOREIGN PATENT DOCUMENTS

DE   40 35 784   6/1991

(Continued)

*Primary Examiner*—Bradley T King
(74) *Attorney, Agent, or Firm*—Walter Ottesen

(57) ABSTRACT

An air spring (2) essentially includes two end elements (4, 6) and an electrically conductive rolling-lobe flexible member which is pressure-tightly arranged therebetween and is made of a flexible elastomeric electroconductive material (14). A reinforcement (16) formed by two cord fiber plies (16a, 16b), which are made of fibers (18), are vulcanized into the flexible member. In order to determine the height (h) of the spring, preferably, the two cord fabric plies (16a, 16b) are provided with a number of highly conductive fibers (18a) which are arranged at the beginning and the end of each ply in a parallel direction to each other, thereby forming two conductive strips (24a, 24b). The conductive strips (24a, 24b) are disposed oppositely to each other and are electrically connected at the end of the rolling-lobe flexible member (8) in such a way that a conductive loop (24) is formed and each strip is used as an element in a branch for an alternating-current measuring bridge (28). The filaments (20) of individual fibers (18) or only certain filaments (20a) of the fibers (18) can be electrically conductive. In addition to determining the height (h) of the spring in a motor vehicle, the inventive device can also be used for determining the air pressure in the flexible member of the air spring (2), the temperature (T) of the flexible member walls and other measurement quantities.

21 Claims, 7 Drawing Sheets

U.S. PATENT DOCUMENTS

2004/0130080 A1 * 7/2004 Binder ................ 267/64.27

FOREIGN PATENT DOCUMENTS

| DE | 44 13 559 | 10/1995 |
| DE | 100 25 631 | 12/2001 |
| DE | 100 26 563 | 12/2001 |
| EP | 0 290 328 | 11/1988 |
| EP | 1253344 A1 * | 10/2002 |

* cited by examiner

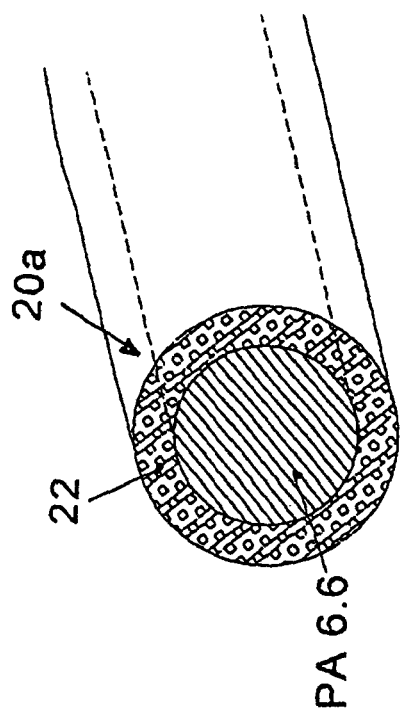
Fig. 3
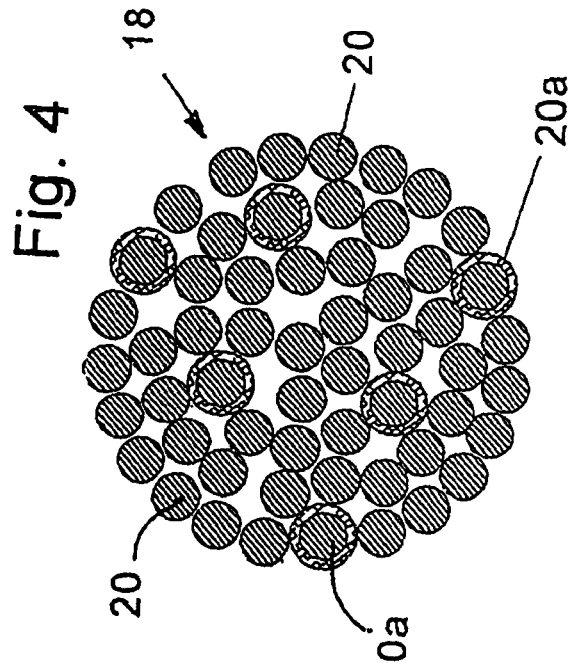
Fig. 4
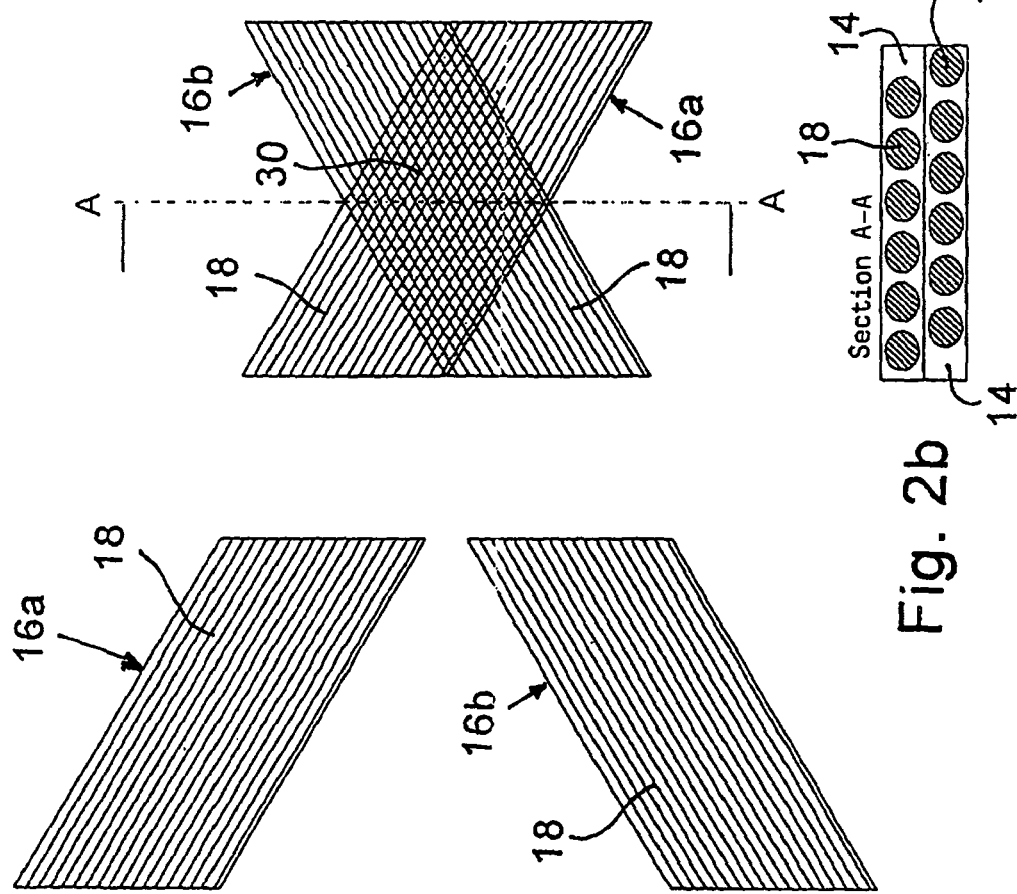
Fig. 2a
Fig. 2b

Ply in the Fabric (Outer Ply)

Plan View

Compressed

Rebounded

Ply 1

R1

Ply 2

R2

PNEUMATIC SPRING PROVIDED WITH A LEVEL MEASURING DEVICE

RELATED APPLICATION

This application is the national stage of PCT/EP 2004/004495, filed Apr. 28, 2004, designating the United States and claiming priority from German patent application no. 103 25 624.5, filed Jun. 6, 2003, the entire contents of which are incorporated herein by reference.

FIELD OF THE INVENTION

The invention relates to an air spring having a level measuring unit such as known, for example, from the publications DE 100 17 562 C1, DE 40 35 784 A1 and DE 44 13 559 A1.

BACKGROUND OF THE INVENTION

In each of the above examples, the air spring comprises essentially two variably mutually spaced end members, namely, a cover and a roll-off piston and a flexible member clamped pressure tight therebetween, especially, a rolling-lobe flexible member.

In publication DE 100 25 631 A1, a method is described wherein the height of the spring is determined by means of the high frequency hollow space resonance. The flexible member must have good conductivity so that the flexible member performs as an electromagnetic hollow space resonator. This can, for example, be achieved in that the reinforcements, which are introduced into the flexible member, are electrically conductive.

This publication emphasizes details of the measuring electronics. Details as to the configuration of the electrically conductive reinforcements are not disclosed.

According to DE 100 17 562 C1, the measurement of height takes place with the aide of two coils one of which is mounted axially secure within the air spring interior space and the other one of the coils is mounted between the cover and the roll-off piston so as to be changeable in length. A level dependent measurement signal results because of the change of the height position of the air spring as well as because of the compression operation. The length-changeable coil can be an integral component of the flexible member, that is, of the wall. This coil is either pressed onto the surface of the flexible member facing inwardly or is glued or is worked directly between the layers.

An application of the coil of this kind on or in the wall of the flexible member requires an additional work step in the production of the flexible member or in the production of the air spring. Problems can develop with the flexibility of the wall of the flexible member (harshness effect) because the coil is not mounted in the plane of the fabric ply or plies.

The flexible members of the air springs, described in publications DE 40 35 784 A1 and DE 44 13 559 A1, likewise show measurement fibers worked into the wall.

It is, however, the case that according to DE 40 35 784 A1, electrical conductors are worked into the wall of the flexible member in the form of a coil or diagonally. Here, the conductor paths are configured as a coil to be changeable in length with the coil being applied to a latex monofil. The incorporation of latex monofil fibers, which are provided with electrically conducting coils, into the wall of the flexible member is likewise associated with additional work complexity in the manufacture.

According to DE 44 13 559 A1, the electrically conductive measuring fibers, which are integrated into the wall of the flexible member, are characterized by running parallel to the fiber direction of a fabric ply and in the longitudinal direction of the flexible member from one flexible member end to the other. Because of the position and the arrangement of these conductor paths, their inductivity changes with the spring height because of the spring operation.

The fibers, which are to be introduced into the wall of the flexible member, comprise, for example, copper strands which must be introduced into the wall of the flexible member in addition to the textile fabric plies or in lieu of individual fibers of the fabric plies. If the copper fibers are not arranged in the plane of the textile reinforcement, then there results overall a stiffening of the wall of the flexible member and the consequences are a pronounced harshness effect. If the copper fibers are in the plane of the textile reinforcement, then there results an inhomogeneous expansion of the wall of the flexible member during loading because of the different expansion characteristics of the copper strands and textile cords whereby the service life of the flexible member is affected.

SUMMARY OF THE INVENTION

The task of the invention comprises providing a wall of the flexible member, which is provided with electrically conductive measuring fibers for an air spring which does not exhibit the disadvantages listed from the state of the art.

The electrically conductive flexible member wall should function especially as measuring means to determine the spring height.

SOLUTION AND ADVANTAGES

The essential essence of the invention lies in a specific configuration of the reinforcement built up from the filaments, namely, in a metalization of the individual filaments.

For this reason, the electrically conductive filaments are an integral component of the textile fabric ply (plies) of the air spring flexible member. The electrically conductive filaments are made of the same basic material as the other, that is, nonconducting filaments and are only coated with a conductive surface. For this reason, an identical, that is, homogeneous expansion behavior results over the entire wall of the flexible member. And because the electrically conductive filaments are not arranged in a separate plane, there results also no stiffening of the wall of the flexible member and therefore also no additional harshness effect. The electrically conductive coating is already undertaken during the manufacture of the filaments. A separate work step during manufacture of the flexible member wall is therefore not present.

The wall of the flexible member, which is provided with electrically conductive filaments in accordance with the invention, defines the basis for the solution of the diverse measuring tasks.

With the solution set forth in the patent claims, not only (as required) a measuring method is provided for determining the spring height.

In addition, the air pressure, which is present in the air spring flexible member, and the temperature of the wall of the flexible member can be determined. Furthermore, a measurement of the fiber expansion is possible. Likewise, occurring or already occurred damage because of stone impact, wear, et cetera, can be detected early. Furthermore, it is possible to transmit electrical energy along the spring flexible member and to heat the air spring flexible member. The structures according to the invention of conductive fibers to build measuring resistances, measuring capacitors and thermal elements are integral components of the fabric in the air spring. In this way, separate measuring quantity transformers for the solution of the particular measuring task are unnecessary.

The integrated sensors are based on similar conductor structures, which, depending upon the circuitry, solve different individual tasks: thus, the conductor strips for expansion measurement can also be used for detecting damage on the outer wall of the flexible member. The same applies for the capacitors for measuring flexible member pressure. The capacitors can also be used for detecting damage caused by wear.

In two applications, the hardware for evaluating the measuring signals is very similar: the alternating current bridge for the evaluation of the capacitances between the fabric plies is also suitable for evaluating the inductivity of the conductor loop for the height measurement.

In detail:

Measurement of the Temperature in the Wall of the Flexible Member

Up to now, discrete temperature sensors (for example, thermoelements) have to be vulcanized in order to be able to determine the temperature in the wall of the flexible member. Alternatively, the temperature can be contactlessly measured from the outside with the aid of pyrometric methods. All methods described are complex and therefore limited to individual applications (for example, in the development of air springs).

Measurement of the Fiber Expansion

The fiber expansion in the fabric of an air spring can not, up to now, be measured directly.

Early Detection of Damage

Wear-caused damage to air spring flexible members (which do not yet lead to air losses) can up to now only be determined via a visual check. Because this is very complex, the air springs are, as a rule, utilized so long until they get noticed because of air loss.

Transmission of Electrical Energy Along the Spring Flexible Member

The air spring flexible member comprises nonconductors. Up to now, cables are necessary in order to supply electronic components in the roll-off piston with electrical energy.

Electrical Heating of Air Spring Flexible Members

At the present time no heatable air springs are known.

The following advantages are presented individually:

a) Measurement of the Flexible Member Pressure

The otherwise required connection point for a pressure sensor is not necessary because of the integrated measuring quantity converter.

b) Measurement of the Temperature in the Wall of the Flexible Member

The integrated resistance paths and the thermal elements, which are formed from conductive fibers, replace external components for measuring temperature. Furthermore, all series air springs can be equipped with a temperature measurement with the conductor structures according to the invention in the fabric. The operational reliability of the spring increases because of the monitoring of the temperature in the rolling lobe which is especially subjected to mechanical load.

c) Measurement of the Fiber Expansion

By connecting the light conductive fibers to form expansion measuring strips, it is now possible to directly measure the expansion of the fibers, which function as reinforcement, and are located within the flexible member wall.

d) Early Detection of Damage

The early detection of damage to an air spring increases the reliability of the vehicle. Furthermore, the detection of wear-caused damage is important in the service life experiments in the context of the development of air springs.

e) Transmission of Electrical Energy Along the Spring Flexible Member

Electrical components, which are disposed in the piston of the air spring system or on the axle, can be supplied with energy without external cables. The electrical energy can be fed via a plug on the cover plate and separate cables are unnecessary because the conductors are an integral part of the air spring flexible member.

f) Electrical Heating of Air Spring Flexible Members

Air spring flexible members with elastomers on the basis of chloroprene are not suitable for applications at temperatures below −25° C. because the elastomer reaches the glass transition point. For lower temperatures, natural rubber is therefore used. With an electrical heating of the spring flexible member with the aid of the conductive fibers in the fabric, the temperature at the outer flexible member wall can be so controlled that it always lies above the glass transition point of chloroprene. In this way, the area of application of this elastomer material expands.

BRIEF DESCRIPTION OF THE DRAWINGS

The invention will now be described with reference to the drawings wherein:

FIG. 2a shows the schematic representation of a crossed arrangement of cord fabric plies in an air spring rolling-lobe flexible member (not shown here in the entirety);

FIG. 2b shows section A-A of FIG. 2a;

FIG. 3 shows a reinforcement filament which is coated with a thin metal layer;

FIG. 4 shows a reinforcement fiber comprising filaments with some of the filaments being metallized;

FIG. 11a shows layer 1 and FIG. 11b shows layer 2;

DESCRIPTION OF THE PREFERRED EMBODIMENTS OF THE INVENTION

Figure 1:
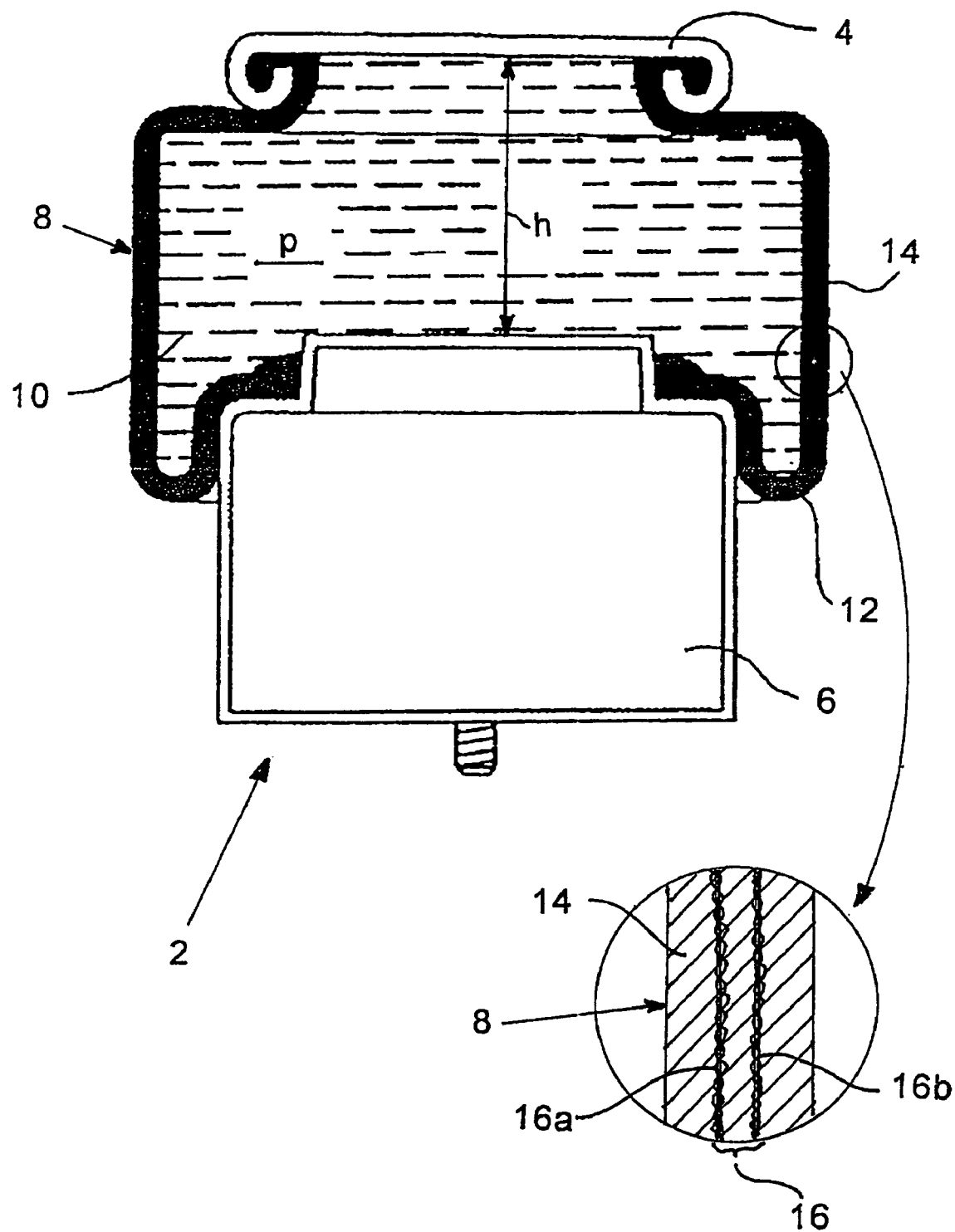
FIG. 1 shows the schematic representation of an air spring in longitudinal section.

The schematic of FIG. 1 shows the essential details of an air spring 2: two end members (4, 6), which are spaced variably from each other, that is, a cover 4 and a roll-off piston 6. The air spring also includes a rolling-lobe flexible member 8 clamped pressure tight between the cover 4 and the roll-off piston 6.

With the aid of a level control system (not shown), the height (level) h, which is given in each case between cover 4 and roll-off piston 6, can be controlled by changing the air pressure p present in the air spring volume 10. The rolling lobe 12 of the flexible member 8 rolls on the outer wall of the roll-off piston 6. The rolling-lobe flexible member 8 comprises an elastomeric material 14 and is reinforced by a reinforcement 16.

The reinforcement 16 of the air spring 2, as a rule, comprises two crossed-over cord fabric plies (16a, 16b) (FIG. 2a) which are each vulcanized into the elastomeric material 14 of the flexible member 8 (FIG. 2b).

The basic idea of the invention is to intersperse the fabric plies (16a, 16b) of the textile reinforcement 16 with fibers 18 which have filaments 20 coated with a thin metal layer 22 (0.6 μm to 0.7 μm) in order to rake them electrically conductive (FIG. 3). To achieve moderate conductivity, only individual metallized filaments 20a are worked into the fiber 18. The conductivity of the fibers 18 increases with the number of metallized filaments 20a (FIG. 4). Also, entire fibers 18 can be metallized (metallized fiber 18a, FIG. 5). The filaments 20 according to the invent: on and the fibers 18 are made, for example, of polyamide PA 6.6 which is coated with nickel, copper and/or silver (metal layer 22).

Figure 5:
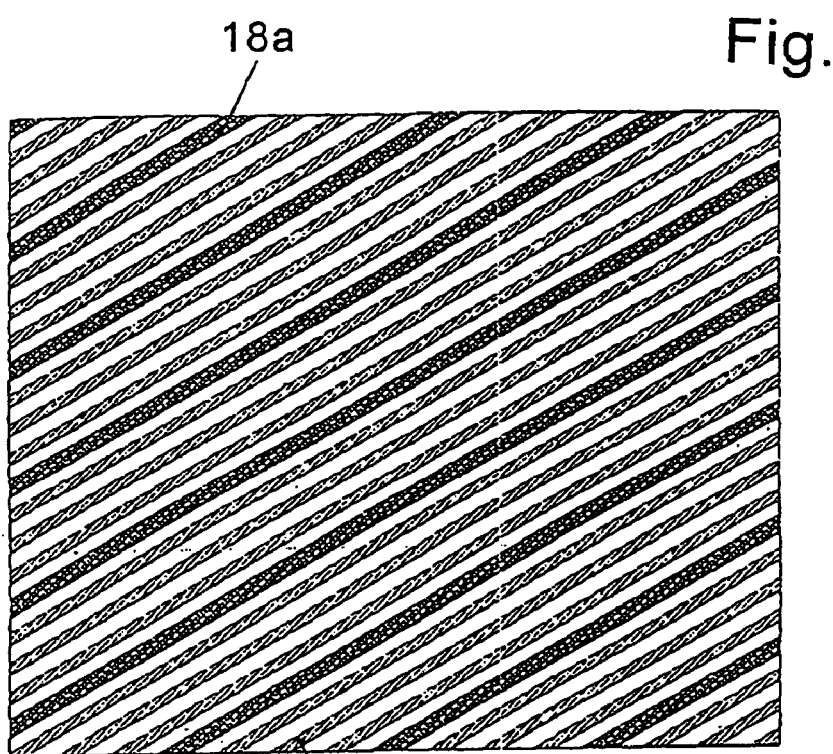
FIG. 5 shows the section from a fabric ply wherein a specific number of conventional fibers are replaced with conductive fibers.

In the manufacture of the fabric plies (16a, 16b), a specific number of conventional fibers 18 is replaced by conductive fibers 18a (FIG. 5). The number and density of the electrically conductive fibers 18a and their electrical conductivity is determined in accordance with the task to be solved.

a) Measuring the Spring Height

Figure 7A:
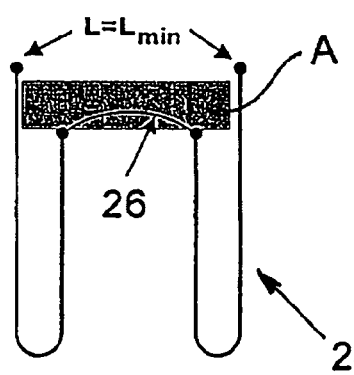
FIGS. 7a/b show schematics of the areas covered by the conductive strips, namely, FIG. 7a in the compressed state and FIG. 7b in the rebound state.
Figure 7B:
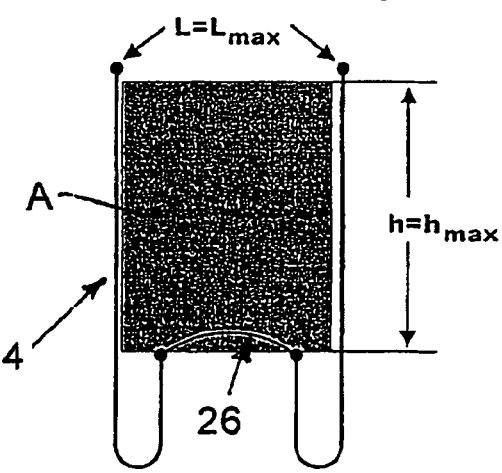
Figure 8:
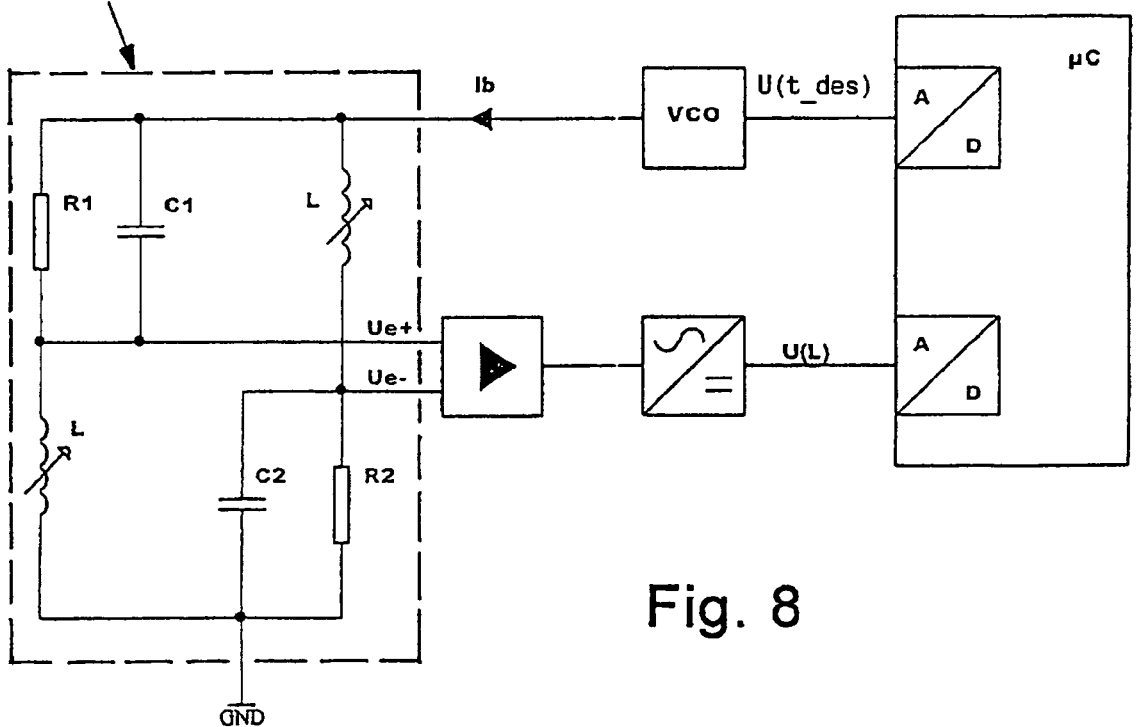
FIG. 8 shows a block circuit diagram with an alternating current bridge circuit of the conductor loops (shown in FIGS. 6a/b and FIGS. 7a/b) for determining the height.

In a fabric ply 16a or 16b or in both fabric plies (16a, 16b), a number of highly conductive fibers 18a is connected in parallel to form a conductor strip (24a and/or 24b). Two conductor strips 24 from the same fabric ply 16a or 16b, which lie on the periphery opposite each other, are connected electrically to each other (bridge 26) at the lower end of the air flexible member and form a conductive loop 24 whose conductivity L is essentially dependent upon the developed area A (FIGS. 7a/b) which increases substantially linearly with the instantaneous spring height. For the evaluation, the conductor loop 24 is placed as a changing element in an alternating-current bridge circuit 28 and is supplied with a high frequency current. With a second conductor loop 24, which is arranged on the periphery offset by 90°, the complete bridge can be assembled (FIG. 8) whose sensitivity can be varied via a frequency f of the supply current.

b) Measurement of Flexible Member Pressure

In each of the two fabric plies (16a, 16b), several highly conductive fibers are connected in parallel to form conductive loops (24a, 24b) which function as an equi-potential area for a capacitive arrangement. The conductor strips (24a, 24b) of the two fabric plies (16a, 16b) are normally insulated with respect to each other by the elastomer 14. Where the strips (24a, 24b) of the two fabric plies (16a, 16b) cross, an electric capacitance C results therebetween whose value is dependent upon the crossover area $A_C$ of the two strips (24a, 24b) (FIG. 9) and from their distance d to each other. The crossover area $A_C$ as well as the distance d between the fabric plies (16a, 16b) are dependent upon the fabric angle γ which becomes less with increasing pressure p, in the spring 2.

$$C = \epsilon_0 \cdot \epsilon_r \cdot A_C(\gamma)/d(\gamma).$$

While the crossover area $A_C$ becomes less because of the fabric angle γ, which becomes ever smaller with increasing pressure p, the thickness of the wall of the flexible member, and therefore the distance d between the fiber layers (16a, 16b), does not change uniformly with the pressure p.

Figure 10:
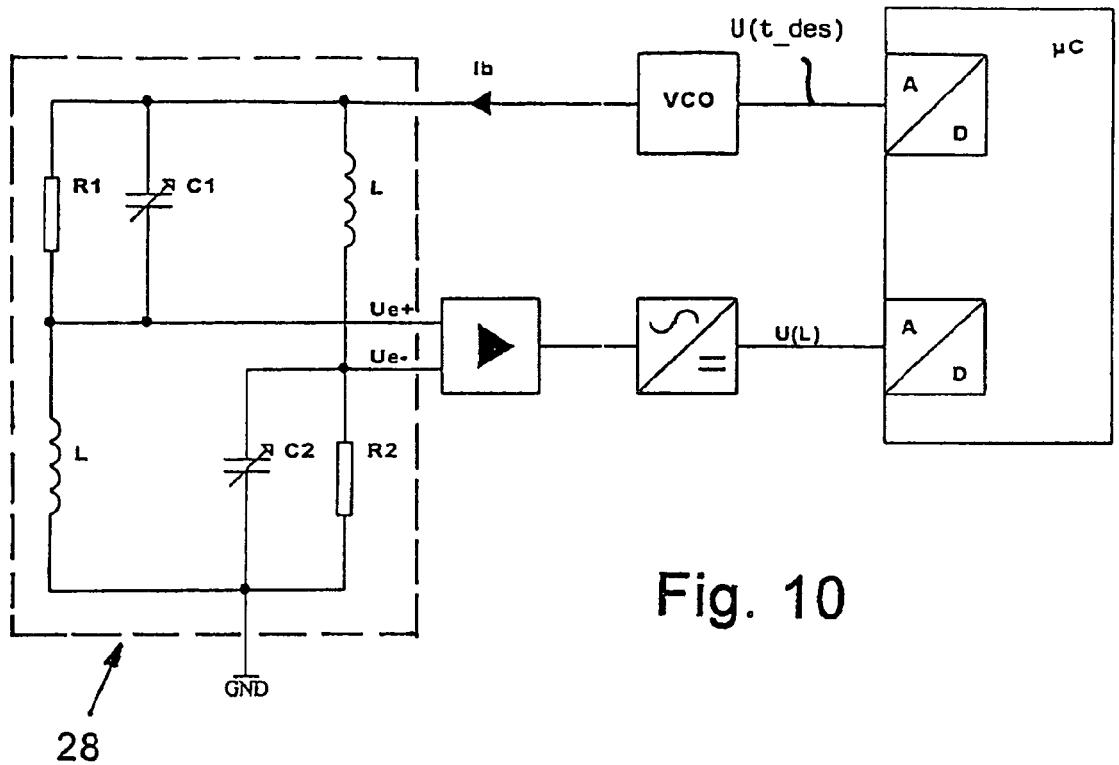
FIG. 10 shows an alternating current bridge circuit for determining the capacity of two crossover locations.

In order to determine the pressure p, the capacitances C at each two crossover locations 30 above the rolling lobe 12 (FIG. 1) are evaluated with the aid of an alternating-current bridge circuit 28 (FIG. 10). The sensitivity of the bridge circuit can be changed via the work frequency f.

c) Measurement of the Temperature in the Wall of the Flexible Member (Resistance Measuring Bridge)

Figure 11A:
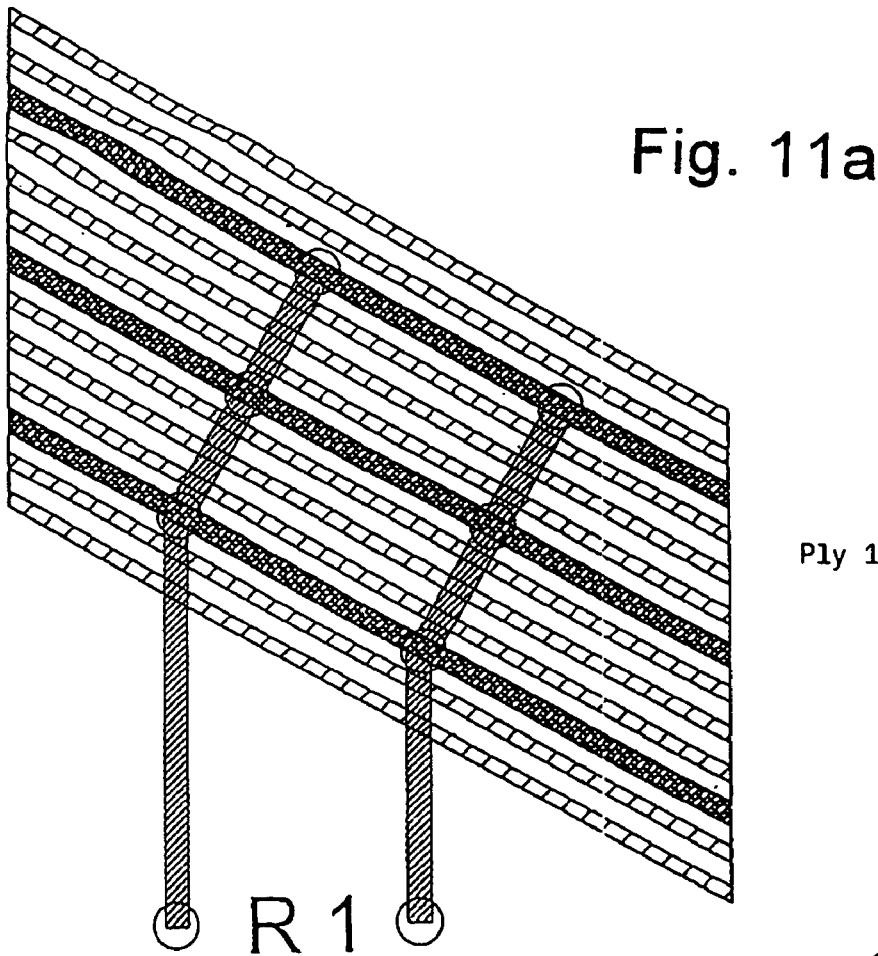
FIGS. 11a/b show schematics of an expansion measuring arrangement, that is.
Figure 11B:
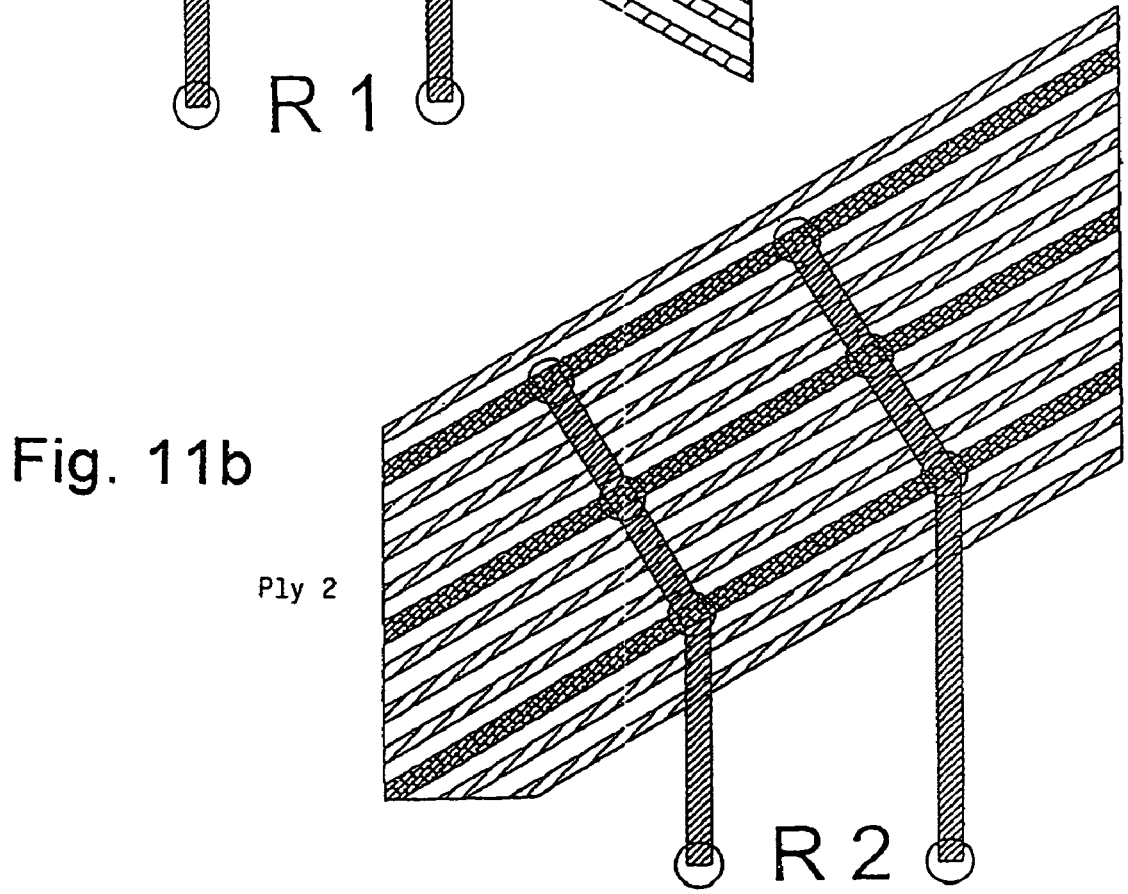
Figure 12:
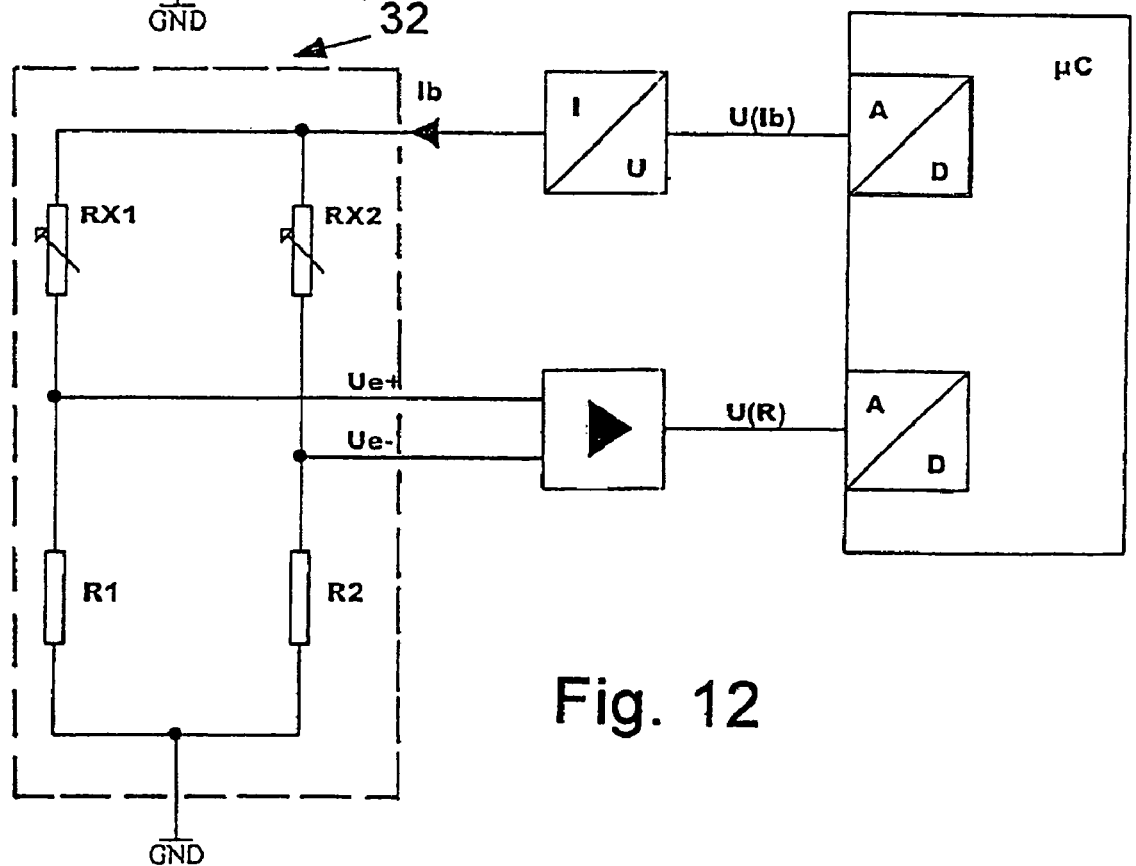
FIG. 12 shows a block circuit diagram with a wheatstone bridge for temperature determination; and, FIG. 13 shows a block circuit diagram with a wheatstone bridge for evaluating the expansion measurement according to FIGS. 11a/b.

The basis of this method are the conductor structures for measuring the fiber expansion (FIGS. 11a/b). The difference comprises that the fibers 18 are made conductive with the aid of different metals which exhibit different temperature coefficients. The temperature dependent and expansion dependent resistance paths are connected as a wheatstone measuring bridge 32 (FIG. 12) and in such a manner that the expansion of the fibers 18 in the two conductor strips mutually compensate while the different temperature coefficients lead to the condition that the resistance changes $\Delta_R$ unbalance the bridge 32 because of the temperature T and generate a corresponding output signal $U_R$.

d) Measurement of the Fiber Expansion

The expansion or stretching of a fiber 18 in the fabric 16 is dependent upon the position of the particular measuring point on the fiber 18. The expansion is minimal at the connection to the piston 6 and increases outwardly over the rolling lobe 12. The fiber expansion is a maximum at the outer wall of the flexible member above the rolling lobe 12.

Figure 13:
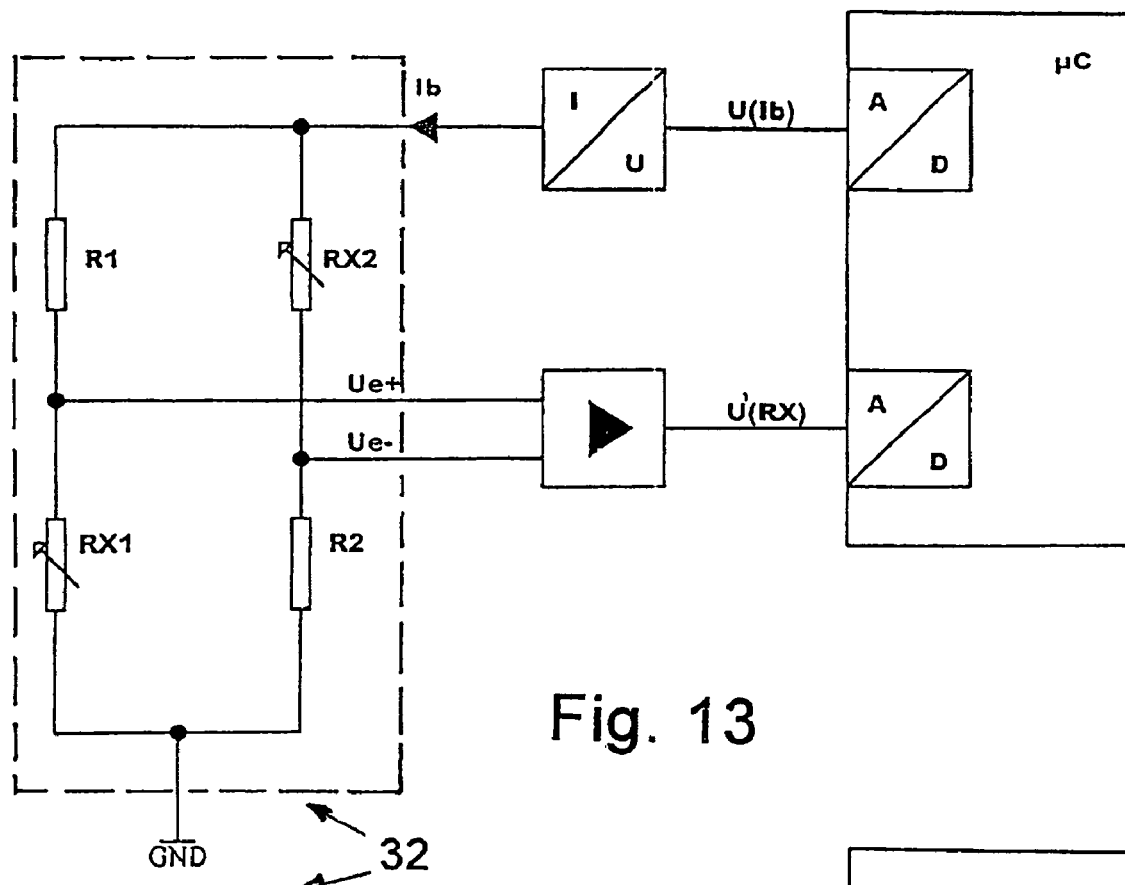

At this location, individual conductive fibers 18a of defined length are collected together in one of the two fabric plies 16a or 16b so that they form an expansion measuring strip (FIGS. 11a/b). The expansion-dependent resistance change of the strip is evaluated with the aid of a wheatstone bridge circuit 32 (FIG. 13).

e) Early Detection of Damage

One Ply

For the detection of damage of the spring flexible member 8, several conductive strips are formed from several fibers 18 in the outer fabric ply 16a or 16b and their total resistance R is monitored (FIGS. 11a/b). Individual filaments 20 or fibers 18a in the conductive strips are damaged or cut through because of damage such as stone impact or abrasion whereby the total resistance R of the strips increases.

Two Plies

Figure 9:
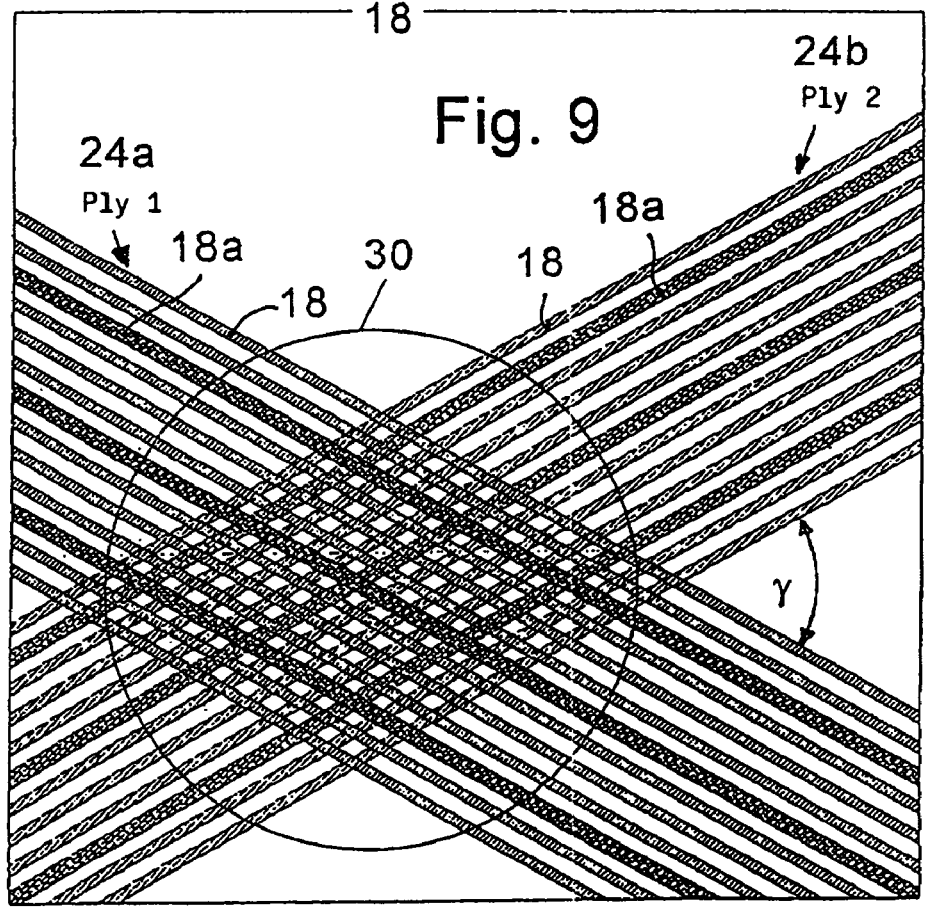
FIG. 9 shows a crossover location of two fabric plies.

Wear-caused damage often begins with the separation of the elastomer 14 from a fabric ply 16a or 16b. In order to detect this damage, conductive strips are formed in both fabric plies (16a, 16b) (FIG. 9). The capacitance C between these strips is monitored. The capacitance changes very greatly when the elastomer 14 separates from a fabric ply 16a or 16b because the resulting dielectric number $\in_r$ thereby reduces drastically.

f) Transmission of Electrical Energy along the Spring Flexible Member

Figure 6A:
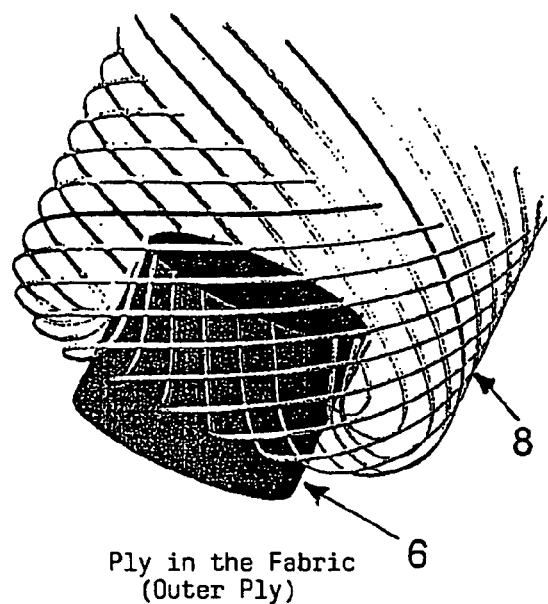
FIG. 6a shows a perspective view of the external fabric ply of an air spring flexible member.
Figure 6B:
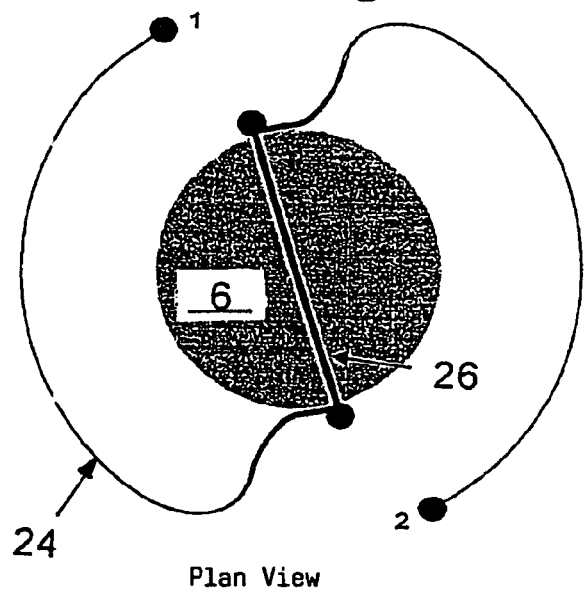
FIG. 6b shows, in plan, two conductor loops which are electrically connected to each other at the lower end of the spring and are arranged in the fabric.

For the transmission of electrical energy to electronic components, which are located in the piston 6 of an air spring 2, several highly conductive fibers 18a in a fabric ply 16a or 16b are combined to the required number of conductors (FIG. 6a, without bridge).

g) Electrical Heating of the Air Spring Flexible Members

A moderate number of conductive fibers 18a of the two fabric plies (16a, 16b) are connected together to form heater resistors and are supplied with electrical energy (FIG. 6a) in order to transfer heat to the wall of the flexible member. The heating of the flexible member can be limited to the rolling lobe 12, which is especially mechanically loaded, in order to reduce the requirement as to electrical heating power.

A control of the heating power ensures that the temperature T of the outer wall of the flexible member 8 does not drop below a critical value. For the control, a temperature sensor is required on the wall of the flexible member in principle. The heating fibers in the fabric are slightly warmer than the wall of the flexible member on the outside because of the heat conductance through the elastomer 14 so that also the temperature T of the wall of the flexible member can be applied as a control quantity.

REFERENCE CHARACTER LIST 2 air spring
4, 6 end members
4 cover
6 roll-off piston, piston
8 rolling-lobe flexible member, air spring flexible member
h height (level) of the air spring
10 air spring volume
p air pressure
12 rolling lobe
14 elastomeric material, elastomer
16 reinforcement, fabric
16a, 16b (cord) fabric ply (plies) of the reinforcement, fiber layer(s)
18 fiber, fibers, filament(s)
18a metallized fiber
20 filament(s)
20a metallized filament
22 metal layer, electrically conductive coating
24 conductor loop
24a conductor strips, number of highly conductive fibers 18a (in fabric ply 16a)
24b the same in fabric ply 16b
A area developed by conductor loop 24
26 bridge
L inductivity of the conductor loop 24
28 alternating-current bridge circuit
f frequency, work frequency
C electrical capacitance between the fabric plies 16a and 16b in the region of the crossover of the two conductor strips
$A_C$ crossover area
d distance of the fabric layers from each other
γ fabric angle
$\in_0$ electrical field constant ($=8.85416 \cdot 10^{-12}$ F·m$^{-1}$)
$\in_r$ dielectric number
30 crossover location
T temperature
$U_T$ thermal stress
32 wheatstone measuring bridge
ΔR resistance change
$U_R$ output signal
R (total) resistance

The invention claimed is:

1. An air spring comprising:
a cover;
a roll-off piston disposed in spaced relationship to said cover;
a rolling-lobe flexible member made of elastomeric material and clamped pressure tight between said cover and said roll-off piston;
said flexible member containing a reinforcement vulcanized into said elastomeric material;
said reinforcement including two cord fabric plies arranged in said flexible member so as to cross over at an angle (γ);
each of said cord fabric plies including a plurality of fibers;
each of said fibers including a plurality of elastomeric filaments; and,
at least a number of the filaments of at least selected ones of said fibers being coated with an electrically conductive material so as to be electrically conductive while simultaneously retaining the same strength as the remainder of said filaments which are not coated.

2. The air spring of claim 1, wherein the electrically conductive filaments have a carrier and an electrically conductive coating covering said carrier.

3. The air spring of claim 2, wherein the electrically conductive coating is a metal layer which is tightly joined to said carrier.

4. The air spring of claim 3, wherein the metallized filaments are coated with at least one of the following metals: nickel, copper and silver.

5. The air spring of claim 1, wherein said selected ones of said fibers are metallized.

6. The air spring of claim 1, wherein a first plurality of said fibers include said selected ones of said fibers and a second plurality of said fibers are metallized fibers; and, the ratio of said second plurality of fibers and said first plurality of fibers and the conductive value of said second plurality of fibers is dependent on the current to be conducted thereby.

7. The air spring of claim 1, wherein:
in one fabric ply or in both fabric plies, a number of highly conductive fibers are connected in parallel at the beginning and at the end of the particular fabric ply and in each case, form conductive strips; and,
two of these conductive strips of a fabric ply, which lie opposite each other at the periphery, are electrically connected to each other at the end of the air spring flexible member and thereby form, in each case, a conductor loop.

8. The air spring of claim 1, wherein several highly conductive fibers of each of said fabric plies form a conductive strip by being connected in parallel; the strips of the two fabric plies are insulated with respect to each other by the elastomer and form an electric capacitance (C) at a crossover location of said fabric plies whereat a crossover area ($A_C$) is defined; the value of the electric capacitance is dependent upon said crossover area ($A_C$) of the two strips and on their distance (d) to each other; and, said crossover area ($A_C$), in turn, is a function of the fabric angle ($\gamma$).

9. The air spring of claim 8, wherein the capacitance (C) of each two crossover locations, which are disposed above the rolling lobe, are respective capacitive impedances of an alternating-current bridge circuit.

10. The air spring of claim 1, wherein said selected ones of said fibers are made conductive with respectively different metals having respectively different temperature coefficients.

11. The air spring of claim 1, wherein several conductive fibers in one fabric ply or in both fabric plies form several conductive strips for the purpose of monitoring the total resistance (R) thereof.

12. The air spring of claim 11, wherein several conductive fibers form conductive strips in both fabric plies; and, the strips form a capacitance (C) at their crossover locations and the magnitude thereof changes in a measurable manner when there is a separation of a fabric ply.

13. The air spring of claim 1, wherein several ones of those fibers having electrically conductive filaments are combined in a fabric ply for the purpose of transmitting electrical energy or electrical signals to at least one electronic component.

14. The air spring of claim 1, wherein several ones of said fibers of both fabric plies have moderately conductive filaments and are connected to each other to form heating resistors.

15. The air spring of claim 14, wherein the rolling lobe of said flexible member is subjected to mechanical load; and, said several ones of said fibers are limited to said rolling lobe.

16. The air spring of claim 15, wherein said air spring further comprises a thermal sensor for detecting a critical limit value; and, a control for controlling said several ones of said fibers by considering said critical limit value.

17. An air spring comprising:
a cover;
a roll-off piston disposed in spaced relationship to said cover;
a rolling-lobe flexible member made of elastomeric material and clamped pressure tight between said cover and said roll-off piston;
said flexible member containing a reinforcement vulcanized into said elastomeric material;
said reinforcement including two cord fabric plies arranged in said flexible member so as to cross over at an angle ($\gamma$);
each of said cord fabric plies including a plurality of fibers;
each of said fibers including a plurality of filaments;
at least a number of the filaments of at least selected ones of said fibers being electrically conductive;
in one fabric ply or in both fabric plies, a number of highly conductive fibers being connected in parallel at the beginning and at the end of the particular fabric ply and in each case, forming conductive strips;
two of these conductive strips of a fabric ply, which lie opposite each other at the periphery, being electrically connected to each other at the end of the air spring flexible member and thereby forming, in each case, a conductor loop; and,
the conductor loops of the two fabric plies forming respective elements in corresponding branches of an alternating-current bridge circuit.

18. The air spring of claim 17, wherein an operating frequency (f) of the alternating-current voltage, which is applied to the alternating-current bridge circuit, is variable.

19. An air spring comprising:
a cover;
a roll-off piston disposed in spaced relationship to said cover;
a rolling-lobe flexible member made of elastomeric material and clamped pressure tight between said cover and said roll-off piston;
said flexible member containing a reinforcement vulcanized into said elastomeric material;
said reinforcement including two cord fabric plies arranged in said flexible member so as to cross over at an angle ($\gamma$);
each of said cord fabric plies including a plurality of fibers;
each of said fibers including a plurality of filaments;
at least a number of the filaments of at least selected ones of said fibers being electrically conductive;
several highly conductive fibers of each of said fabric plies forming a conductive strip by being connected in parallel; the strips of the two fabric plies being insulated with respect to each other by the elastomer and forming an electric capacitance (C) at a crossover location of said fabric plies whereat a crossover area ($A_C$) is defined; the value of the electric capacitance being dependent upon said crossover area ($A_C$) of the two strips and on their distance (d) to each other; and, said crossover area ($A_C$), in turn, being a function of the fabric angle ($\gamma$);
the capacitance (C) of each two crossover locations, which are disposed above the rolling lobe, being respective capacitive impedances of an alternating-current bridge circuit; and,
an alternating voltage having a selectable operating frequency (f) being applied to said alternating-current bridge circuit; and, said alternating-current bridge circuit having a sensitivity which can be changed by selecting said operating frequency (f).

20. An air spring comprising:
a cover;
a roll-off piston disposed in spaced relationship to said cover;
a rolling-lobe flexible member made of elastomeric material and clamped pressure tight between said cover and said roll-off piston;
said flexible member containing a reinforcement vulcanized into said elastomeric material;
said reinforcement including two cord fabric plies arranged in said flexible member so as to cross over at an angle ($\gamma$);
each of said cord fabric plies including a plurality of fibers;
each of said fibers including a plurality of filaments;
at least a number of the filaments of at least selected ones of said fibers being electrically conductive;
said selected ones of said fibers being made conductive with respectively different metals having respectively different temperature coefficients; and,
conductive fibers of each of said fabric plies forming a conductive strip; the conductive fibers defining temperature dependent and expansion dependent resistance paths which form elements of a wheatstone measuring bridge in such a manner that the expansion of the fibers mutually compensate in the conductive strips; whereas, said different temperature coefficients have, as a consequence, a temperature-dependent unbalance with a corresponding output signal.

21. An air spring comprising:

a cover;

a roll-off piston disposed in spaced relationship to said cover;

a rolling-lobe flexible member made of elastomeric material and clamped pressure tight between said cover and said roll-off piston;

said flexible member containing a reinforcement vulcanized into said elastomeric material;

said reinforcement including two cord fabric plies arranged in said flexible member so as to cross over at an angle ($\gamma$);

each of said cord fabric plies including a plurality of fibers;

each of said fibers including a plurality of filaments;

at least a number of the filaments of at least selected ones of said fibers being electrically conductive; and, in one fabric ply or in both fabric plies, individual fibers of defined length being combined to define an expansion measuring strip and forming an element of a wheatstone bridge circuit.

\* \* \* \* \*

UNITED STATES PATENT AND TRADEMARK OFFICE
CERTIFICATE OF CORRECTION

| | | |
|---|---|---|
| PATENT NO. | : 7,837,181 B2 | Page 1 of 1 |
| APPLICATION NO. | : 10/559233 | |
| DATED | : November 23, 2010 | |
| INVENTOR(S) | : Reck et al. | |

It is certified that error appears in the above-identified patent and that said Letters Patent is hereby corrected as shown below:

On the Title Page:
Under (75) Inventors: delete "Pehmuller" and substitute -- Pehmöller -- therefor.

In column 2:
Line 32: delete "SOLUTION AND ADVANTAGES".

In column 5:
Line 33: delete "rake" and substitute -- make -- therefor.

Line 39: delete "invent: on" and substitute -- invention -- therefor.

Signed and Sealed this
Seventh Day of June, 2011

David J. Kappos
*Director of the United States Patent and Trademark Office*